Patented July 21, 1942

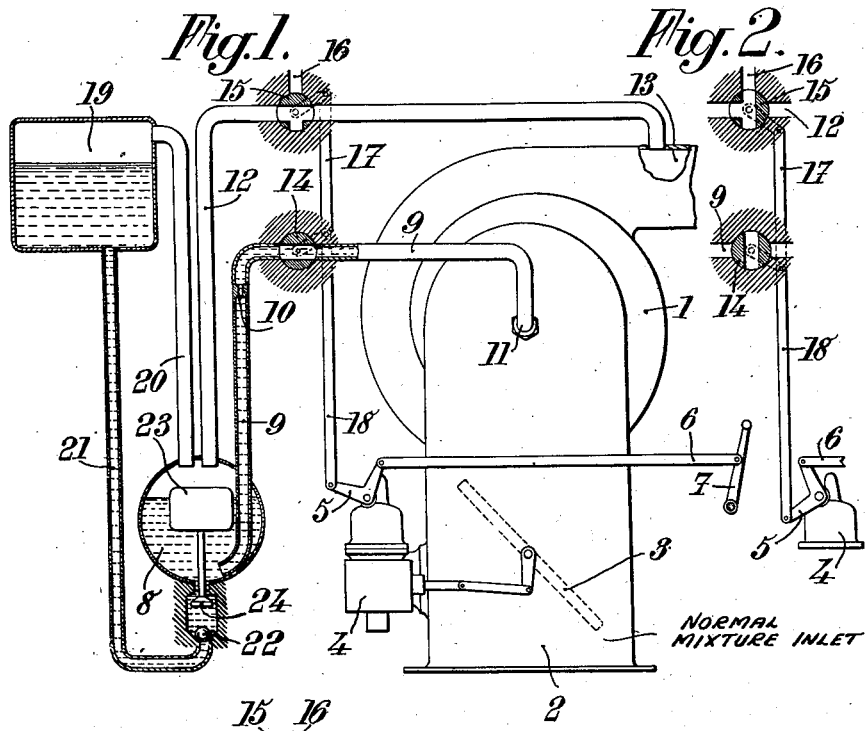
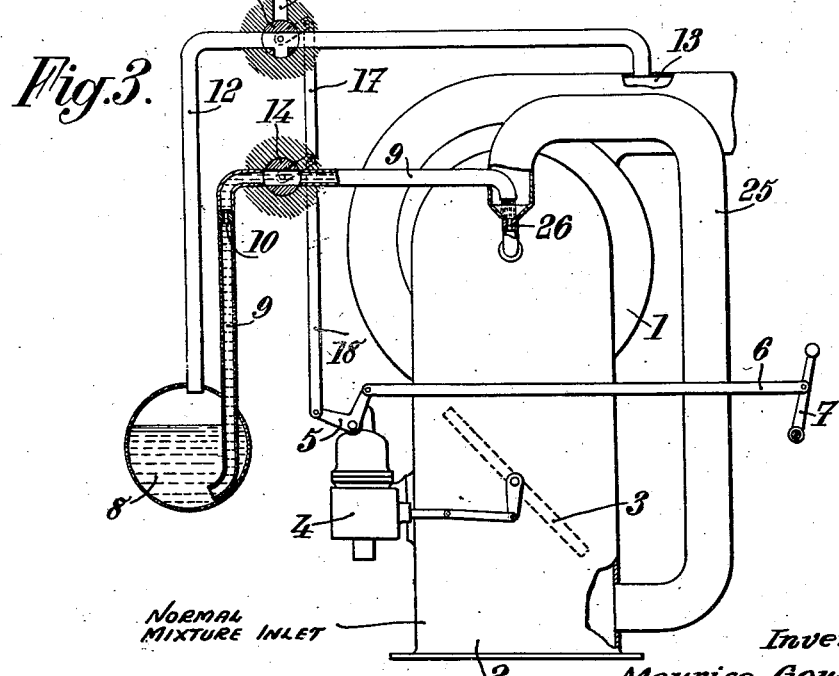

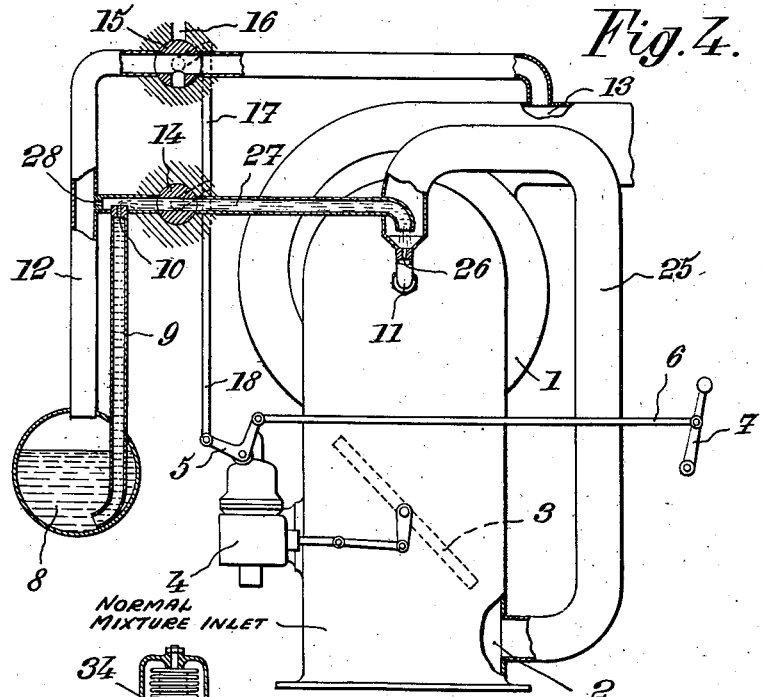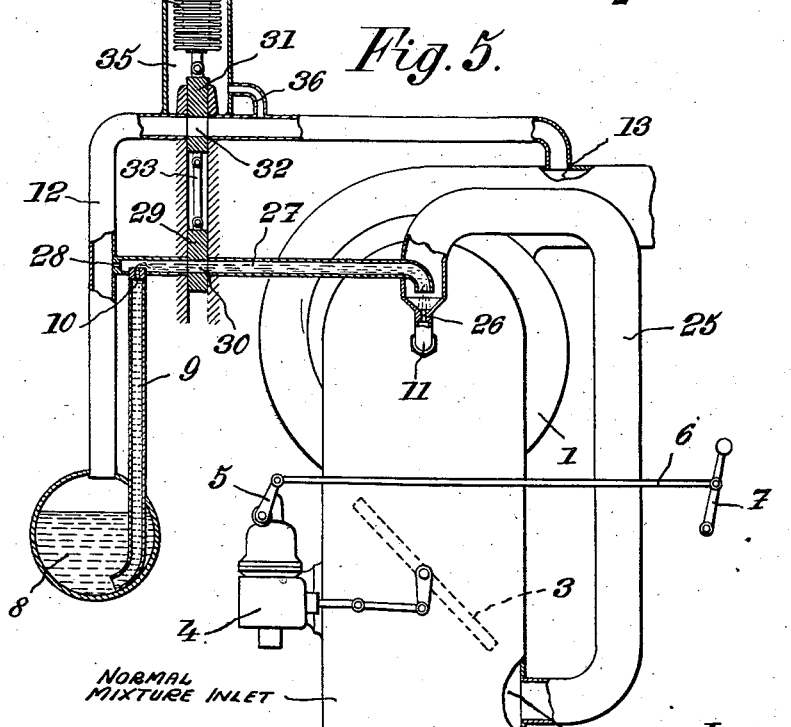

2,290,610

UNITED STATES PATENT OFFICE 2,290,610

AUXILIARY CARBURETION DEVICE FOR SUPERCHARGED INTERNAL COMBUSTION ENGINES

Maurice Goudard, Neuilly-sur-Seine, France, assignor to Société Anonyme Solex, Neuilly-sur-Seine, France, a society of France Application May 10, 1939, Serial No. 272,880
In France June 8, 1938

9 Claims. (Cl. 123—119)

This invention relates to auxiliary carburetion devices for supercharged internal combustion engines and especially but not exclusively to such devices for aircraft engines.

It is known to make such engines function, for certain conditions, with an excess of supercharging to give an excess of power, for example for the taking-off or the ascent of aircraft.

When this excess of supercharging is brought into action it is necessary, and known, considerably to increase the proportion of fuel in the air-fuel mixture and, in some cases, to add to the ordinary fuel a fuel having particular qualities, so as to increase the anti-detonating qualities of the mixture supplied to the engine.

The present invention has for its main object so to make these auxiliary carburetion devices that they respond, better than hitherto, to the different desiderata of practice.

In general, according to the principal feature of the invention, such devices are so constructed and arranged that the pressure of the fluid, downstream of the supercharging compressor, is utilised to assure the charging of the engine with supplementary fuel or with special fuel, the supply of this additional fuel varying, under the effect of this pressure, directly with the pressure prevailing downstream of the said compressor.

In accordance with a further feature of the invention, the fluid under pressure (which comes downstream of the supercharging compressor) is caused to act on the free surface of the additional fuel, contained in a reservoir, to force this fuel upstream of the said compressor.

A still further feature consists in utilising the fluid under pressure (which comes downstream of the supercharging compressor) not only, on the one hand, for sending the additional fuel upstream of the compressor but also, on the other hand, for mixing it with air between its exit from the reservoir and its admission upstream of the compressor.

Another feature consists in sending the additional fuel or the air fuel mixture into a chamber communicating, on the one hand, with the upstream part of the supercharging compressor and, on the other hand, with the general air inlet of the said compressor, through orifices having respective dimensions such that the variations of depression, produced by the suction of the compressor, are practically without effect in the said chamber.

A still further feature consists in utilising, in combination with the devices which assure the supply of additional fuel as above set forth, a compressor having admission-limiting means comprising a control which varies, in a known manner, the value of the constant pressure existing downstream of the compressor, this control being coupled with an apparatus by which the devices above mentioned are brought into action.

Another feature consists in utilising, in combination with the devices for assuring the supply of additional fuel as above mentioned, an automatic device for bringing the said devices into and out of action and comprising, for example, slide valves, pistons or diaphragms actuated by a barometric or manometric means subjected to the pressure existing at a suitably chosen point downstream or upstream of the supercharging compressor.

In order that the invention may be better understood, it will now be described with reference to the accompanying drawings, which are given by way of example and in which—

Fig. 1 shows, in diagrammatic vertical section, a device constructed according to a first embodiment of the invention and in which the supplementary or special fuel is admitted in the direction of the axis of the rotor of a supercharging centrifugal compressor, the controlling members being in the "on" position.

Fig. 2 shows, similarly, these same members in their "off" position.

Fig. 3 shows, similarly, a device constructed according to a second embodiment of the invention and for which the fuel passes into a chamber communicating with the general inlet of the compressor.

Fig. 4 shows, similarly, a device constructed according to a third embodiment of the invention and for which the fuel is mixed with air and passes into a chamber communicating with the general air inlet of the compressor.

Fig. 5 shows, similarly, a device constructed according to a fourth embodiment of the invention, the operation of which is effected automatically by a manometric capsule.

On Fig. 1, there has been shown a centrifugal compressor 1 having an air inlet 2 and a delivery conduit 13. The air inlet comprises a known admission regulator, constituted by a shutter 3 actuated by a servo-motor 4 of any type. The action of this servo-motor on the shutter 3 is such that the delivery pressure in 13 remains substantially constant. A known device makes it possible to vary the value of this constant pressure by acting on the servo-motor, for example through a lever 5 actuated by the rod 6 and the lever 7, this lever 7 being, for example, at the disposal of the pilot or coupled to any suitable control.

The device forming the subject of the invention comprises a reservoir of feed tank 8 for fuel, which can, in some cases, be a special fuel, destined to be supplied to the engine to conform with a certain degree of supercharging, that is to say when the pressure in 13 exceeds a certain value. A dipping tube 9, provided with a calibrated orifice 10, is for supplying the fuel into the pipe in turn supplying the cylinders, for example by opening at 11 into the air inlet of the compressor. A conduit 12 communicates to the reservoir 8 the pressure existing in the conduit 13.

In the tube 9 is provided a valve 14 connected by a connecting-rod 18 to the lever 5, the movement of which is for varying the degree of supercharging of the engine.

In the conduit 12 is provided a three-way valve 15, which either causes the reservoir 8 to communicate with the conduit 13, or with the atmosphere by an orifice 16; the movement of this valve is also controlled by a connecting-rod 17 and the rod 18 connected to the lever 5.

On Fig. 1 there has also been shown a reservoir 19, generally of dimensions greater than those of the reservoir 8, for supplying this latter with fuel.

For this purpose, the reservoir 19 communicates with the reservoir 8 by a conduit 21 which can be obturated by a ball 22 preventing the fuel passing from the reservoir 8 to the reservoir 19.

Finally, the reservoir 8 comprises a float 23 coupled to a valve 24 which obturates the communication between the reservoir 19 and the reservoir 8 when the level in the reservoir 8 comes to a certain height.

The device, shown on Figs. 1 and 2, operates as follows:

When the engine functions at a degree of supercharging such that it necessitates the introduction of an excess of fuel or of a special fuel—this degree of supercharging being determined by the position of the lever 7 which controls the servo-motor and by which there is therefore obtained the regulation of the pressure in 13—the various members of the device come in the position shown on Fig. 1.

The pressure in the conduit 13 then acts, by passing through the valve 15, on the level of the fuel contained in the reservoir 8 and compels this fuel to pass through the conduit 9, the calibrated orifice 10, the valve 14, and to issue at 11 upstream of the compressor. The fuel is then sent through the conduit 13 into the intake pipe of the engine.

The calibrated orifice 10 determines the necessary discharge of fuel.

It is obvious that the delivery of fuel is so much the greater as the pressure exerted on the free surface of the fuel contained in the reservoir 8 and which corresponds to the pressure in the conduit 13 is itself more considerable.

It is advantageous, particularly for an aircraft engine, to locate the reservoir 8 as near as possible to the outlet 11, for it is preferable that the position of this outlet 11 with respect to the level of the reservoir 8 shall be substantially the same whatever may be the inclinations given to the other members of the device.

For this reason it will not always be possible to locate a sufficiently large fuel reservoir in the neighbourhood of the centrifugal compressor 1 and the arrangement of Fig. 1 shows the method of utilising an auxiliary tank 8 the bulk of which can be relatively slight and which, in consequence can be mounted quite close to the compressor. This auxiliary tank is charged by a reservoir 19 of larger dimensions and the distance of which from the auxiliary tank 8 can be rather considerable.

It has been supposed, on Fig. 1, that the charging of the reservoir 8 by the reservoir 19 takes place by gravity, although it is obvious that this charging can equally take place by a fuel pump of any type. The fuel contained in the reservoir 19 falls by gravity into the conduit 21, raises the ball 22 and replenishes the auxiliary tank 8 by lifting the float 23.

When the level of the fuel in the reservoir 8 is sufficiently high, the float 23 applies the valve 24 on its seat and the supplying of the auxiliary tank 8 stops. The ball 22 prevents the fuel, contained in the auxiliary tank 8, returning to the reservoir 19. A conduit 20 serves to equalise the pressures in the two reservoirs 8 and 19.

In this way and whatever may be the dimensions and the conditions of operation of the auxiliary tank 8, this latter will be constantly filled with fuel coming from the reservoir 19.

In order to stop the excess of supercharging necessitating the employment of supplementary or special fuel, the pilot acts on the lever 5 by operating the hand lever 7. The movement of the lever 5 closes the valves 14 and 15 and puts them in the position shown on Fig. 2.

In this position, the pressure in 13 is no longer exerted on the free level of the fuel in the reservoirs 8 and 19 and these latter are, on the contrary, subjected to the atmospheric pressure, for example through the orifice 16. The conduit 9 is obtured by the valve 14 to avoid the depression, which exists in 11, producing the aspiration of the fuel away from the reservoir 8.

Fig. 3 shows a device similar to that of Figs. 1 and 2 but in which there has not been provided a system for charging the reservoir 8 from a main reservoir 19. Such a charging system could, however, obviously be applied to Fig. 3 in the manner indicated on Fig. 1.

On this Fig. 3 there have been represented the same essential elements as on Fig. 1, the compressor 1, its air inlet 2, the servo-motor 4, the lever 5 for regulation of the pressure in 13 actuated by the connecting-rod 6 and the hand lever 7; this lever 5 is also coupled, by the rods 17 and 18, to the valves 14 and 15. The pressure in 13 is transmitted to the reservoir 8 by the conduit 12, the fuel is expelled by the conduit 9, the calibrated orifice 10, the valve 14 and it passes into a chamber 25 communicating with the air inlet 2 upstream of the shutter 3, by an opening of relatively large section and with the air inlet of the compressor downstream of the shutter 3, by a calibrated orifice 26 of relatively small section.

The ratio of the sections of the orifice 26 and of the conduit 25 is such that the variations of suction which exist downstream of the shutter 3 and which are transmitted into the chamber 25 through the orifice 26 practically do not make themselves felt therein, the pressure existing in the chamber 25 being practically that existing at the general air inlet of the compressor upstream of the shutter 3.

The device has for its object to avoid the conduit 9, which delivers the fuel, being subjected to the depression which exists upstream of the compressor, downstream of the shutter 3, the variations of this depression having the disadvantage of being able to vary the discharge of fuel delivered by the conduit 9.

Fig. 4 shows, similarly, the same device as Fig. 3, but in this case the conduit 12, which transmits the pressure into the reservoir 8, comprises a calibrated orifice 28 opening into a conduit 27 in which the valve 14 is located. Into this conduit 27 there also opens, by a calibrated orifice 10, the conduit 9 through which the fuel is expelled from the reservoir 8.

This conduit 27 opens into a chamber 25 communicating, by an opening of relatively large section, with the air inlet 2 of the compressor, upstream of the shutter 3, and by an opening 26 of relatively small section with the inlet of the compressor and downstream of the shutter 3, in such manner that the variations of depression, exerted between the orifice 26 and the compressor, have practically no influence on the conduit 27. In this case the conduit 27 delivers, not fuel, but a mixture of air and fuel.

This device permits of separating the reservoir 8 from the compressor 1. In effect, in this case, it is the position of the outlet from the conduit 9 into the conduit 27 which must be almost constant with respect to the level of the fuel contained in the reservoir 8.

Fig. 5 shows the same device as Fig. 4 with this difference that the valves 14 and 15, which up to now were actuated by the lever 5 the movement of which regulates the pressure in 13, are replaced by valves, slide valves or otherwise actuated by an automatic device influenced by the pressure existing in the conduit 13. In this case the lever 5 is only connected to the hand lever 7 which serves to vary the constant value of the pressure in 13.

The obturators of the conduits 27 and 12 are constituted, for example, by slide valves 29 and 31 in which are disposed respectively ports 30 and 32.

These two slide valves are connected by a connecting-rod 33 and one of these slide valves, for example that designated by 31, is coupled to the movable part of an apparatus sensitive to the pressure variations existing in the conduit 13, for example a manometric capsule 34 located in a chamber which is made to communicate, through a conduit 36, with the conduit 12 and consequently with the outlet of the compressor 13.

The positions of the slide valves 29 and 31 therefore depend upon the variations of the pressure in the conduit 13 and which acts on the capsule 34. In particular, if the pilot operates the hand lever 7 so as sufficiently to diminish the degree of supercharging of the engine, that is to say the pressure in 13, the capsule 34 lengthens so that the ports 30 and 32 are no longer opposite the conduits 27 and 12, which are thus obturated.

It should be noted that in the whole of the foregoing the carburetion system proper of the engine has not been mentioned. In effect, this carburetion system does not intervene directly and it can, in consequence, be constituted in any suitable manner and, for example, in the usual manner, and be located downstream or upstream of the compressor.

What I claim:

1. An auxiliary carburetion device for supplying additional fuel to a supercharged internal combustion engine when said engine must furnish excess power comprising a compressor with an inlet conduit and outlet conduit, one of said conduits communicating with the normally acting carburetting means, means for supplying additional fuel in said inlet conduit when the engine must furnish excess power, a tank containing said additional fuel, a feed conduit between said tank and said fuel supply means and a pressure-transmitting conduit established between the outlet conduit of the compressor and said tank, and a calibrated orifice connecting permanently said feed conduit to said pressure-transmitting conduit.

2. An auxiliary carburetion device for supplying additional fuel to a supercharged internal combustion engine when said engine must furnish excess power comprising a compressor with an inlet conduit and outlet conduit, one of said conduits communicating with the normally acting carburetting means, means for supplying additional fuel in said inlet conduit when the engine must furnish excess power, a tank containing said additional fuel, a feed conduit between said tank and said fuel supply means, a pressure-transmitting conduit established between said outlet conduit of the compressor and the upper part of said tank.

3. An auxiliary carburetion device for supplying additional fuel to a supercharged internal combustion engine when said engine must furnish excess power comprising a compressor with an inlet conduit and outlet conduit, one of said conduits communicating with the normally acting carburetting means, a shutter established in said inlet conduit, a controlling device for said shutter for regulating the supply of said compressor, means for supplying additional fuel in said inlet conduit when the engine must furnish excess power, a tank containing said additional fuel, a feed conduit between said tank and said fuel supply means, a pressure-transmitting conduit established between said outlet conduit of the compressor and the upper part of said tank, obturating members established respectively in said feed conduit and said pressure-transmitting conduit for regulating the passage sections of said conduits, common actuating means for said obturating members and means for connecting the controlling device of said shutter to said actuating means.

4. An auxiliary carburetion device for supplying additional fuel to a supercharged internal combustion engine when said engine must furnish excess power comprising a compressor with an inlet conduit and an outlet conduit, one of said conduits communicating with the normally acting carburetting means, means for supplying additional fuel in said inlet conduit when the engine must furnish excess power, a tank containing said additional fuel, a feed conduit between said tank and said fuel supply means, a pressure-transmitting conduit established between said outlet conduit of the compressor and the upper part of said tank, an obturating member established in said feed conduit and a three-way cock established in said pressure-transmitting conduit and which places said tank in communication with the atmosphere when said cock occupies a position obturating said pressure-transmitting conduit.

5. An auxiliary carburetion device for supplying additional fuel to a supercharged internal combustion engine when said engine must furnish excess power comprising a compressor with an inlet conduit and an outlet conduit, one of said conduits communicating with the normally acting carburetting means, a shutter established in said inlet conduit, a chamber connected to said inlet conduit, upstream of said shutter and permanently communicating with said inlet conduit downstream of said shutter, means for supplying additional fuel in said chamber, feeding means for said fuel supply means and means transmitting the action of the pressure prevailing in the outlet conduit of said compressor on said feeding means so that the delivery of the additional fuel varies directly as the pressure existing in said outlet conduit.

6. An auxiliary carburetion device as claimed in claim 5 wherein a small calibrated orifice is provided between said chamber and the inlet conduit of the compressor so that the pressure variations in said inlet conduit are practically without effect in said chamber.

7. An auxiliary carburetion device for a supercharged internal combustion engine comprising a compressor with an inlet conduit and outlet conduit, one of said conduits communicating with the normally acting carburetting means, means for supplying additional fuel in said inlet conduit when the engine must furnish excess power, a tank containing said additional fuel, a feed conduit between said tank and said fuel supply means, a pressure-transmitting conduit established between said outlet conduit of the compressor and the upper part of said tank, obturating members established respectively in said feed conduit and said pressure-transmitting conduit for regulating the passage sections of said conduits, and common actuating means for said obturating members.

8. An auxiliary carburetion device for a supercharged internal combustion engine comprising a compressor with an inlet conduit and outlet conduit, one of said conduits communicating with the normally acting carburetting means, means for supplying additional fuel in said inlet conduit when the engine must furnish excess power, a tank containing said additional fuel, a feed conduit between said tank and said fuel supply means, a pressure-transmitting conduit established between said outlet conduit of the compressor and the upper part of said tank, obturating members established respectively in said feed conduit and said pressure-transmitting conduit for regulating the passage sections of said conduits, and manometric means for automatically actuating said obturating members.

9. An auxiliary carburetion device for a supercharged internal combustion engine comprising a compressor with an inlet conduit and outlet conduit, one of said conduits communicating with the normally acting carburetting means, means for supplying additional fuel in said inlet conduit when the engine must furnish excess power, a tank containing said additional fuel, a feed conduit between said tank and said fuel supply means, a pressure-transmitting conduit established between said outlet conduit of the compressor and the upper part of said tank, obturating members established respectively in said feed conduit and said pressure-transmitting conduit for regulating the passage sections of said conduits, and manometric means, submitted to the action of the pressure prevailing in the outlet of the compressor, for automatically actuating said obturating members.

MAURICE GOUDARD.